United States Patent
Araki (10) Patent No.: US 7,027,906 B2
(45) Date of Patent: Apr. 11, 2006

(54) COMBUSTION CONTROL OF INTERNAL COMBUSTION ENGINE

(75) Inventor: Takashi Araki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 25 days.

(21) Appl. No.: 10/815,996

(22) Filed: Apr. 2, 2004

(65) Prior Publication Data
US 2004/0261414 A1    Dec. 30, 2004

(30) Foreign Application Priority Data
Apr. 2, 2003    (JP)    ............................. 2003-099232

(51) Int. Cl.
*G05D 1/00*    (2006.01)

(52) U.S. Cl. ...................... 701/104; 701/103; 123/381; 123/435

(58) Field of Classification Search ................ 701/104, 701/103; 123/406.45, 406.47, 381, 435
See application file for complete search history.

(56) References Cited

U.S. PATENT DOCUMENTS 5,586,537 A * 12/1996 Tomisawa et al. .......... 123/435
6,247,311 B1   6/2001 Itoyama et al.
6,370,870 B1   4/2002 Kamijo et al.
6,886,334 B1 * 5/2005 Shirakawa .................... 60/602

FOREIGN PATENT DOCUMENTS

JP    3-45181    9/1991

\* cited by examiner

*Primary Examiner*—Tony M. Argenbright
*Assistant Examiner*—Johnny H. Hoang
(74) *Attorney, Agent, or Firm*—Foley & Lardner LLP (57) ABSTRACT

The Inventor invented a combustion control device which optimizes combustion regardless of the cetane number of a fuel of an internal combustion engine (1) by focusing on the correlation between the cetane number and specific gravity of the fuel, and correcting combustion control based on the specific gravity of the fuel. The combustion control device comprises a sensor (7, 32, 36, 37) which detects the specific gravity of the fuel, a device which adjusts a combustion-related element of the internal combustion engine (1) such as fuel injection, compression end in-cylinder temperature and an intake air swirl (15, 19, 27, 51), and a controller (21) programmed to correct a target value of the element based on the specific gravity of the fuel (S414, S424, S430), and control the adjusting device so that the corrected target value is realized (S415, S425, S430).

12 Claims, 11 Drawing Sheets

7 AIR FLOW METER
31 WATER TEMPERATURE SENSOR
32 CRANK ANGLE SENSOR
33 CYLINDER DISCRIMINATION SENSOR
34 PRESSURE SENSOR
35 TEMPERATURE SENSOR
36 ACCELERATOR PEDAL DEPRESSION SENSOR
37 AIR-FUEL RATIO SENSOR
51 SWIRL CONTROL VALVE

COMBUSTION CONTROL OF INTERNAL COMBUSTION ENGINE

FIELD OF THE INVENTION

This invention relates to combustion control of an internal combustion engine.

BACKGROUND OF THE INVENTION

JikkoHei 3-45181published by the Japanese Patent Office in 1991 discloses a sensor which detects the cetane number of the light oil which is the fuel of a diesel engine based on fuel viscosity, and controls the fuel injection timing of the diesel engine according to the cetane number. This prior art technique states that the cetane number becomes higher, the higher is the viscosity of the light oil.

SUMMARY OF THE INVENTION

Figure 2:
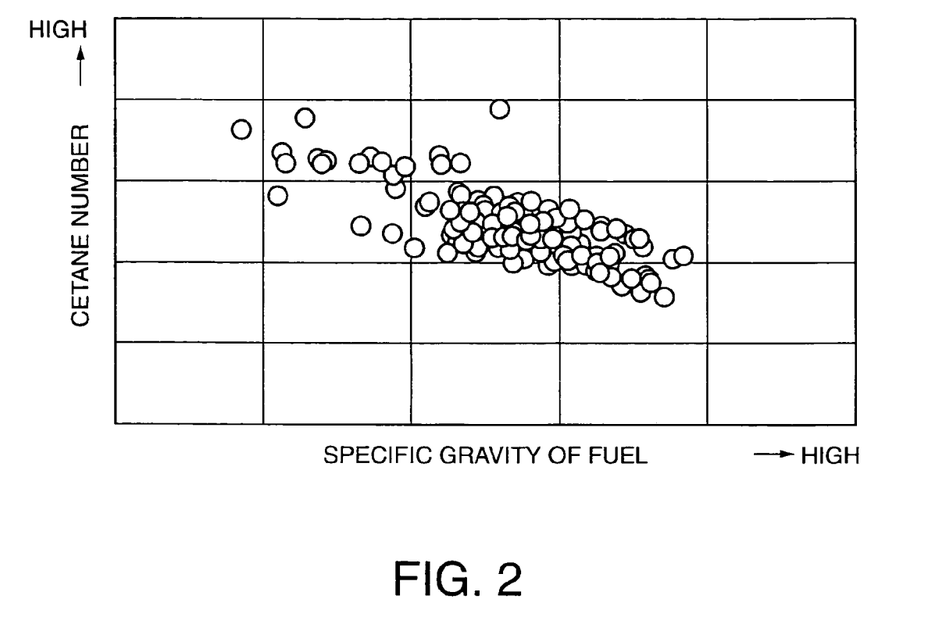
FIG. 2 is a diagram showing a relation between specific gravity and cetane number which the Inventor investigated for light oil commercially available in Japan.
Figure 3:
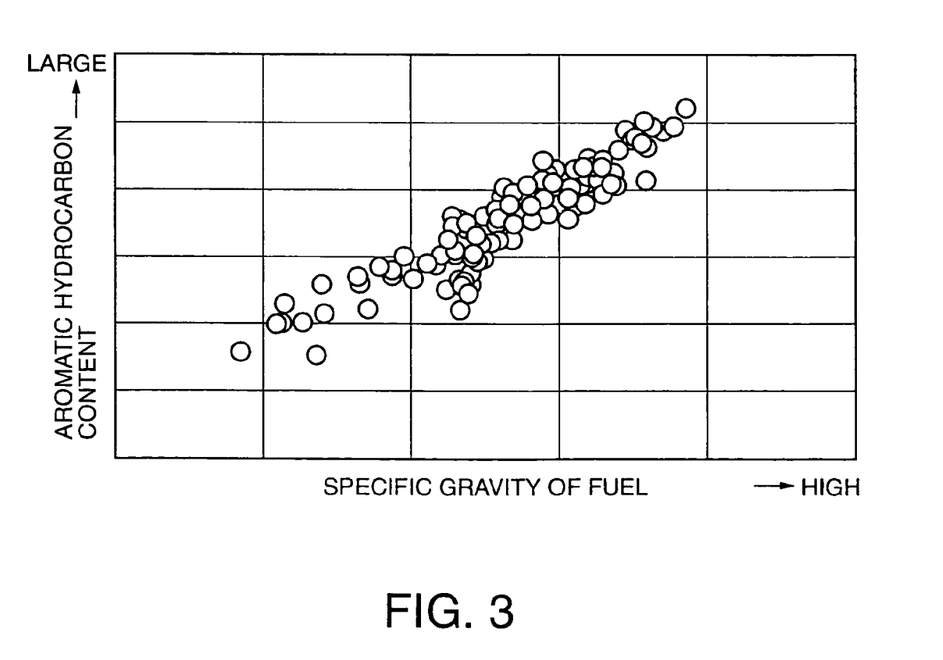
FIG. 3 is a diagram showing a relation between the specific gravity of a light oil and aromatic hydrocarbon content which the Inventor investigated for light oil commercially available in Japan.
Figure 4:
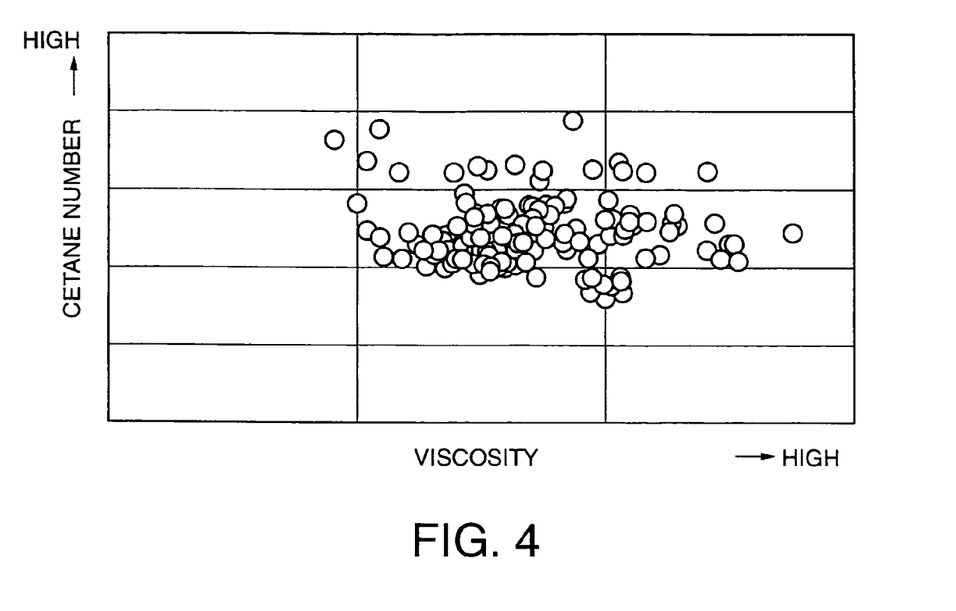
FIG. 4 is a diagram showing a relation between viscosity and cetane number which the Inventor investigated for light oil commercially available in Japan.

The Inventor of this invention examined the connection between specific gravity and cetane number, specific gravity and aromatic hydrocarbon content, and viscosity and cetane number, for various light oils which are commercially available in Japan. FIGS. 2–4 show the results of this investigation.

The Inventor also investigated the connection between specific gravity and octane number, specific gravity and 10% distillation point, specific gravity and aromatic hydrocarbon content, and specific gravity and heat production amount for constant weight for various gasolines which are commercially available in Japan. FIGS. 12–15 show the results of this investigation.

According to the Inventor's investigation results, as shown in FIG. 4, a significant relation was not found between the viscosity and cetane number of light oil.

According to the results of the Inventor's investigation of light oils, as shown in FIG. 2, the cetane number of a light oil decreases in inverse proportion to its specific gravity. As shown in FIG. 3, the aromatic hydrocarbon content increases, the higher is the specific gravity.

Figure 12:
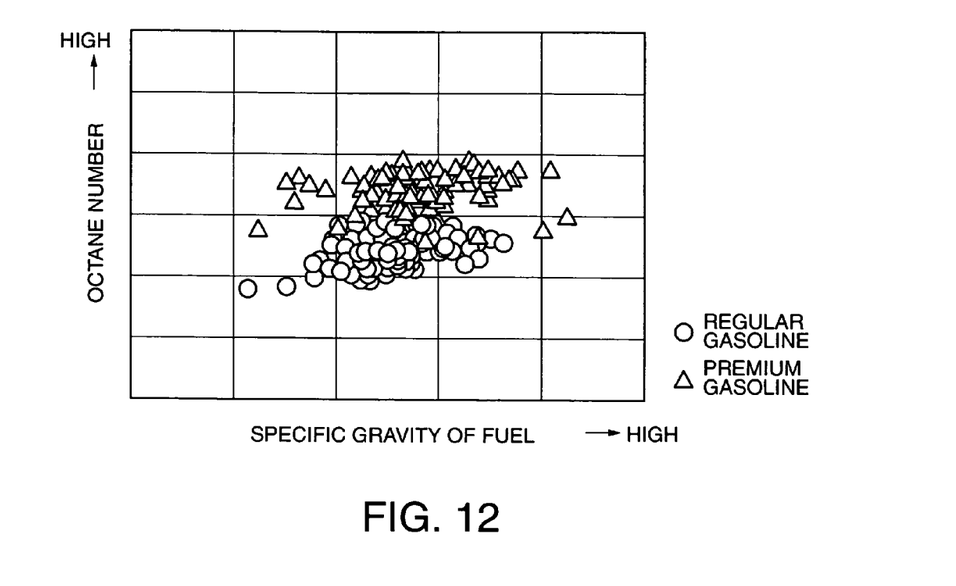
FIG. 12 is a diagram showing a relation between the specific gravity and octane number investigated by the Inventor for gasoline commercially available in Japan.
Figure 13:
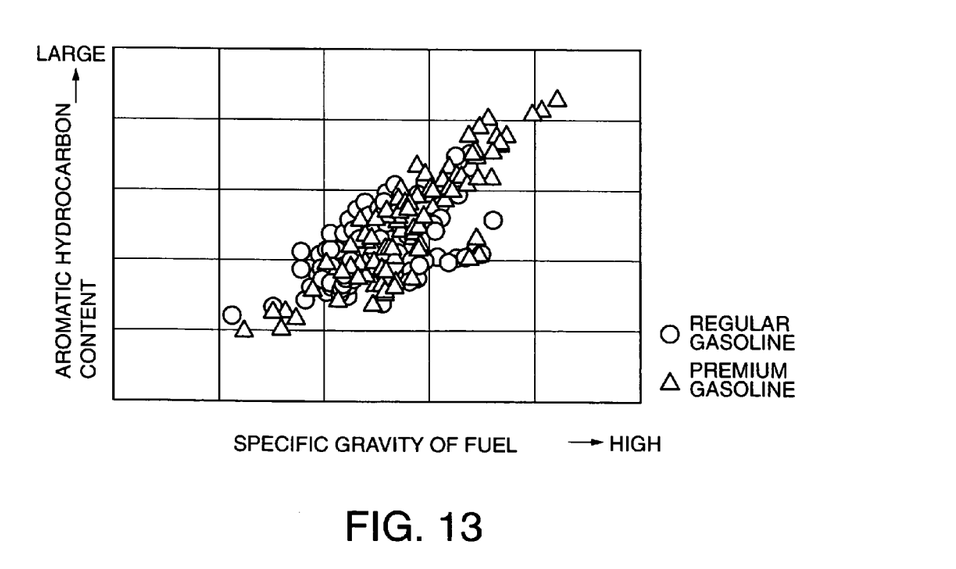
FIG. 13 is a diagram showing a relation between the specific gravity and aromatic hydrocarbon content investigated by the Inventor for gasoline commercially available in Japan.
Figure 14:
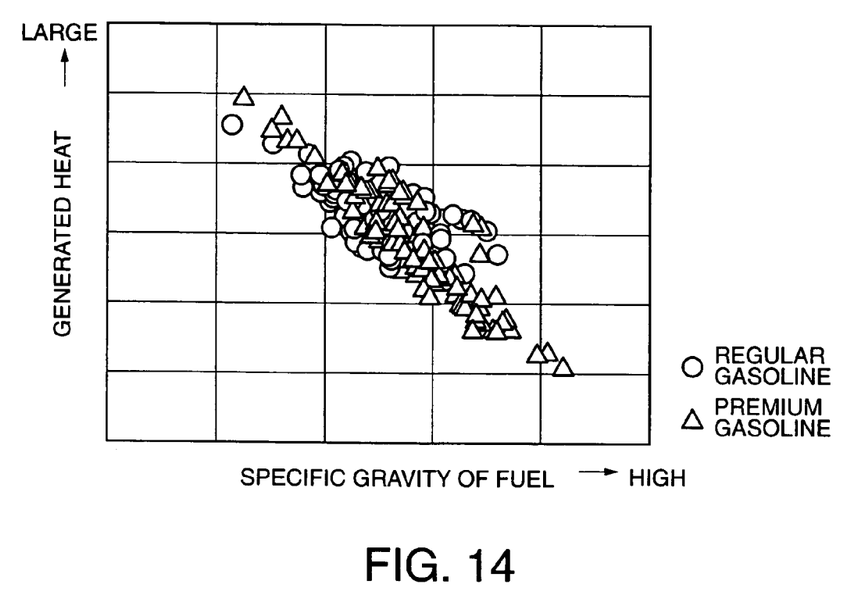
FIG. 14 is a diagram showing a relation between the viscosity and heat production amount of gasoline investigated by the Inventor for gasoline commercially available in Japan.

According to the results of the Inventor's investigation of gasolines, as shown in FIG. 12, the octane number increases in proportion to the specific gravity of the fuel. Herein, the octane number has the characteristic that it shows the converse behavior to the cetane number. As shown in FIG. 13, the higher is the specific gravity of gasoline, the more the aromatic hydrocarbon content increases. In aromatic hydrocarbons, the ratio of hydrocarbon components is small, so gasoline containing a large amount of aromatic hydrocarbons has a low heat production amount. As a result, as shown in FIG. 14, as the specific gravity of gasoline becomes higher the heat production amount becomes smaller. This slope is identical for light oil.

In a diesel engine or a gasoline engine, in order to achieve desirable combustion conditions, fuel injection control, of compression end in-cylinder temperature and swirl control are performed. These controls are affected by a difference in the cetane number of the fuel, and a desirable result is not obtained even if control values optimized for reference fuel are applied to fuel having a different cetane number from the reference fuel.

It is therefore an object of this invention to optimize these combustion controls according to differences in the fuel.

In order to achieve the above object, this invention provides a combustion control device of an internal combustion engine, comprising a combustion adjusting device which adjusts a combustion-related element of the internal combustion engine, a sensor which detects a parameter related to a specific gravity of fuel burnt by the internal combustion engine, and a programmable controller which controls the combustion adjusting device.

The controller is programmed to correct, based on the parameter, a target value of the element which has been defined with respect to a reference fuel, and control the combustion adjusting device so that the target value is realized.

This invention also provides a combustion control method for the internal combustion engine. The method comprises determining a specific gravity of fuel burnt by the internal combustion engine, correcting a target value of the element which has been defined with respect to a reference fuel, based on the specific gravity of the fuel, and controlling the combusting adjusting device so that the target value is realized.

The details as well as other features and advantages of this invention are set fourth in the remainder of the specification and are shown in the accompanying drawings.

FIELD OF THE INVENTION

Figure 1:
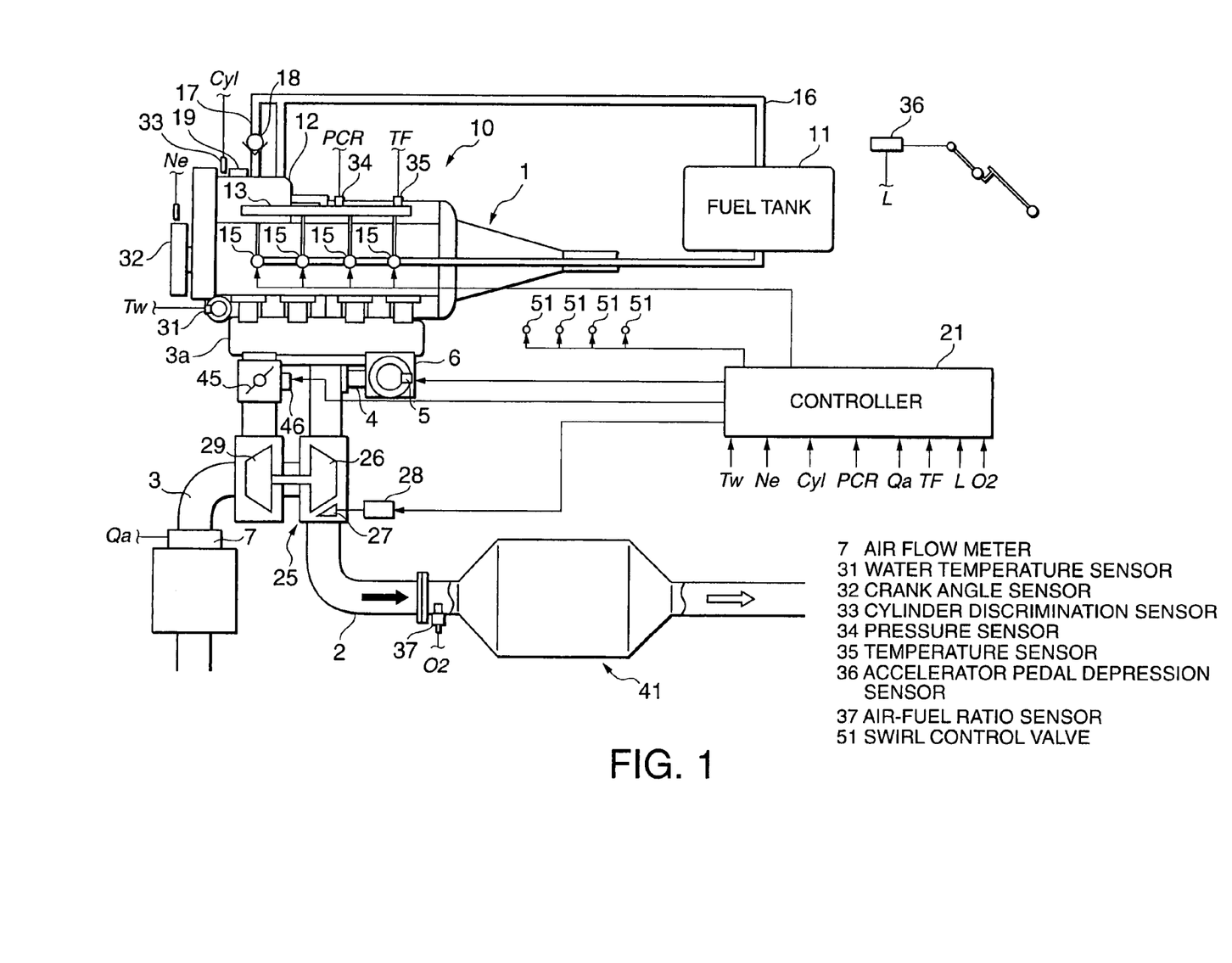
FIG. 1 is a schematic diagram of a combustion control device of an internal combustion engine according to this invention.

Referring to FIG. 1 of the drawings, a multi-cylinder diesel engine 1 for a vehicle injects fuel with a common-rail type fuel injection device 10 into air aspirated from an intake passage 3 so as to generate an air-fuel mixture in each cylinder, and burns the air-fuel mixture by compression ignition. The combustion gases are then discharged from an exhaust passage 2 as burnt gas.

A part of the exhaust gas in the exhaust passage 2 returns to a collector 3a of the intake passage 3 via an exhaust gas recirculation (EGR) passage 4. An EGR valve 6 is provided in the EGR passage 4. The EGR valve 6 is driven by a stepping motor 5 in response to a control signal from a controller 21, and a valve opening is varied so that a target EGR rate according to the running condition of the engine 1 is attained. When the combustion temperature of the fuel in the engine 1 rises, the generation amount of nitrogen oxides (NOx) increases. Exhaust gas recirculation has a desirable effect on combustion temperature suppression.

The common-rail type fuel injection device 10 comprises a fuel tank 11, supply pump 12, common-rail 13 and fuel injection nozzle for each cylinder. The supply pump 12 aspirates light oil from the fuel tank 11 via a fuel supply passage 16, pressurizes it and supplies it to the common-rail 13. The common-rail 13 has a pressurizing chamber, and supplies fuel at a fixed fuel pressure via a three-way electromagnetic valve 15 to the fuel injection nozzle in each cylinder.

The three-way valve 15 is a needle valve. In the OFF state, the needle valve sits on a valve seat, and in the ON state, the fuel nozzle injects fuel when the needle valve lifts. The change-over timing from OFF to ON of the three-way valve 15 determines the fuel injection start timing, and the ON time determines the fuel injection amount. If the pressure of the common-rail 13 is fixed, the fuel injection amount increases, the longer is the ON time.

This common-rail-type fuel injection device 10 is known from U.S. Pat. No. 6,247,311.

A valve which varies the cross-sectional area of the fuel passage to the fuel injection nozzle is further attached to the three-way valve 15. The initial fuel injection rate at the time of fuel injection varies with the opening of this valve.

In order to control the pressure of the common-rail 13, some of the fuel discharged by the supply pump 12 is returned to the fuel supply passage 16 via an overflow passage 17 provided with a check valve 18. A pressure control valve 19 is formed in the overflow passage 17.

The pressure control valve 19 changes the flowpath area of the overflow passage 17 according to a duty control signal from the controller 21. As a result, the amount of fuel discharged from the supply pump 12 to the common-rail 13 varies and the pressure of the common-rail 13 varies. A target value of the common-rail pressure is predetermined according to the running condition of the engine 1. The controller 21 performs feedback control of the pressure control valve 19 so that a real common-rail pressure detected by a pressure sensor 34 coincides with the target value.

The diesel engine 1 is equipped with a variable geometry turbocharger 25 in order to supercharge intake air. The variable geometry turbocharger 25 comprises an exhaust gas turbine 26 disposed downstream of the junction of the EGR passage 4 of the exhaust passage 2, and a compressor 29 formed in the intake passage 3. The variable geometry turbocharger 25 supercharges the air in the intake passage 3, when the exhaust gas turbine 26 which rotates with the energy of the exhaust gas of the exhaust passage 2 drives the compressor 29.

A variable nozzle 27 is formed at the inlet of the exhaust gas turbine 26. The opening of the variable nozzle 27 is varied by an actuator 28 in response to a signal from the controller 21. An opening variation of the variable nozzle 27 varies the exhaust gas flowrate into the exhaust gas turbine 26. The controller 21 varies the opening of the variable nozzle 27 according to the rotation speed of the diesel engine 1 so that a predetermined supercharging pressure is obtained from the low rotation speed region of the diesel engine 1. Specifically, in the low rotation speed region of the diesel engine 1, the opening of the variable nozzle 27 is reduced and the exhaust gas flow velocity into the exhaust gas turbine 26 is increased, whereas in the high rotation speed region, the opening of the variable nozzle 27 is increased, and the inflow resistance of the exhaust gas is reduced.

The actuator 28 comprises a diaphragm actuator which responds to a control pressure and drives the variable nozzle 27, and a pressure control valve which adjusts the control pressure supplied to the diaphragm actuator. The controller 21 generates a duty control signal so that the real opening of the variable nozzle 27 coincides with a target nozzle opening, and by outputting the duty signal to the pressure control valve, controls the valve opening of the variable nozzle 27.

An exhaust gas purification control device 41 comprising an oxidation catalyst and a NOx trap catalyst are disposed in the exhaust passage 2 downstream of the exhaust gas turbine 26. When the diesel engine 1 is performing lean combustion with a larger excess air ratio than 1.0, the NOx trap catalyst traps nitrogen oxides (NOx) discharged in the exhaust gas, and when the diesel engine 1 is performing rich combustion with an excess air ratio of less than 1.0, or at the stoichiometric air-fuel ratio, the trapped NOx is reduced by hydrocarbons (HC) and carbon monoxide (CO) in the exhaust gas as reducing agents. When the NOx trap amount of the NOx trap catalyst reaches the upper limit of the allowable range, in order to reduce and purify the trapped NOx, the controller 21 controls the excess air ratio of the air-fuel mixture so that the diesel engine 1 performs rich combustion.

It may be impossible to achieve rich combustion or combustion at the stoichiometric air-fuel ratio with the turbocharger 25 alone. Hence, an intake throttle 45 is provided in the intake passage 3 immediately upstream of the collector 3a. The intake throttle 45 is driven by a diaphragm actuator 46 in response to a control pressure from a pressure control valve. The actuator 46 is constructed like the actuator 28 of the variable nozzle 27, and operates according to a duty control signal from the controller 21.

A swirl control valve 51 is formed in each cylinder. The swirl control valve 51 is a valve which reduces the intake cross-sectional area of the diesel engine 1, and by reducing the intake cross-sectional area, increases the intake air flow velocity which enhances movement of gas in the combustion chamber, and thereby improves the combustion rate of the air-fuel mixture. The swirl control valve 51 is known from U.S. Pat. No. 6,370,870.

The swirl control valve 51 is driven by a stepping motor similarly constructed to the stepping motor 5 for the EGR valve 6. The controller 21 outputs a signal to the stepping motor according to the rotation speed and load of the diesel engine 1, and thereby varies the opening of the swirl control valve 51.

The controller 21 comprises a microcomputer provided with a Central Processing Unit (CPU), read-only memory (ROM), random-access memory (RAM) and input/output interface (I/O interface). It is also possible to form the controller from plural microcomputers.

For the controller to perform these various kinds of control, detection data are inputted into the controller 21 as signals from various sensors which detect the running state of the diesel engine 1.

These sensors comprise a water temperature sensor 31 which detects a cooling water temperature Tw of the diesel engine 1, crank angle sensor 32 which detects a rotation speed Ne of the diesel engine 1, a cylinder discrimination sensor 33 which distinguishes which cylinder is performing which piston stroke and outputs a corresponding cylinder discrimination signal Cyl, a pressure sensor 34 which detects a fuel pressure PCR of a common-rail 13, an air flow meter 7 which detects an intake air flowrate Qa of the intake passage 3, a temperature sensor 35 which detects a fuel temperature TF of the common-rail 13, an accelerator pedal depression sensor 36 which detects a load L of the diesel engine 1 from an accelerator pedal depression amount, and an air-fuel ratio sensor 37 which detects an oxygen concentration O2 of the exhaust gas.

Of the controls performed by the controller 21, there are only three controls which concern this invention, i. e., pilot injection control, compression end in-cylinder temperature control and swirl control. All these controls are intended to reduce the generation amount of hydrocarbons (HC) generated when the diesel engine 1 is operated under low-temperature conditions.

Pilot injection control is control concerning the fuel injection timing and injection amount of the fuel injection nozzle. It is referred to as a pilot injection because a little fuel is injected in advance of the main injection by the fuel injection nozzle, i. e., the usual injection. The control of the injection timing and injection amount of this pilot injection is pilot injection control. Appropriately performing pilot injection has the effect of reducing discharge of hydrocarbons (HC) when the diesel engine 1 is running at low temperature.

Compression end in-cylinder temperature control means temperature control of the compressed air-fuel mixture at compression top dead center of each cylinder. The compression end in-cylinder temperature can be increased by increasing the intake flowrate of the diesel engine 1, by temporarily lowering the cooling capacity of the cooling mechanism of the diesel engine 1, by heating the intake air of the diesel engine 1, or by continuing to heat after start-up of the diesel engine 1 by glow lamp, referred to as "after-glow".

Increasing the compression end in-cylinder temperature when the diesel engine 1 is at low temperature, has the effect of reducing discharge of hydrocarbons (HC).

Swirl control means control of the opening of the swirl control valve 50,. By closing the swirl control valve 50, an intake air swirl is formed in the cylinder that has the effect of reducing discharge of hydrocarbons (HC) when the diesel engine 1 is at low temperature.

These three kinds of control have an almost equivalent effect in reducing the HC discharge amount when the diesel engine 1 is running at low temperature. Therefore, it can be attempted to decrease the HC discharge amount when the diesel engine 1 is at low temperature by carrying out at least one of these controls.

As stated above, the Inventor discovered that by applying these controls uniformly to fuels of different specific gravities, a desirable HC discharge reduction effect was not necessarily obtained.

This invention therefore performs these controls according to the specific gravity of the fuel.

This control will be described in detail referring to FIGS. 7–11. In this embodiment, it shall be assumed that all three kinds of control, i. e., fuel injection control, compression end in-cylinder temperature control and swirl control, are performed. In the following description, these controls are referred to collectively as combustion control.

Figure 7:
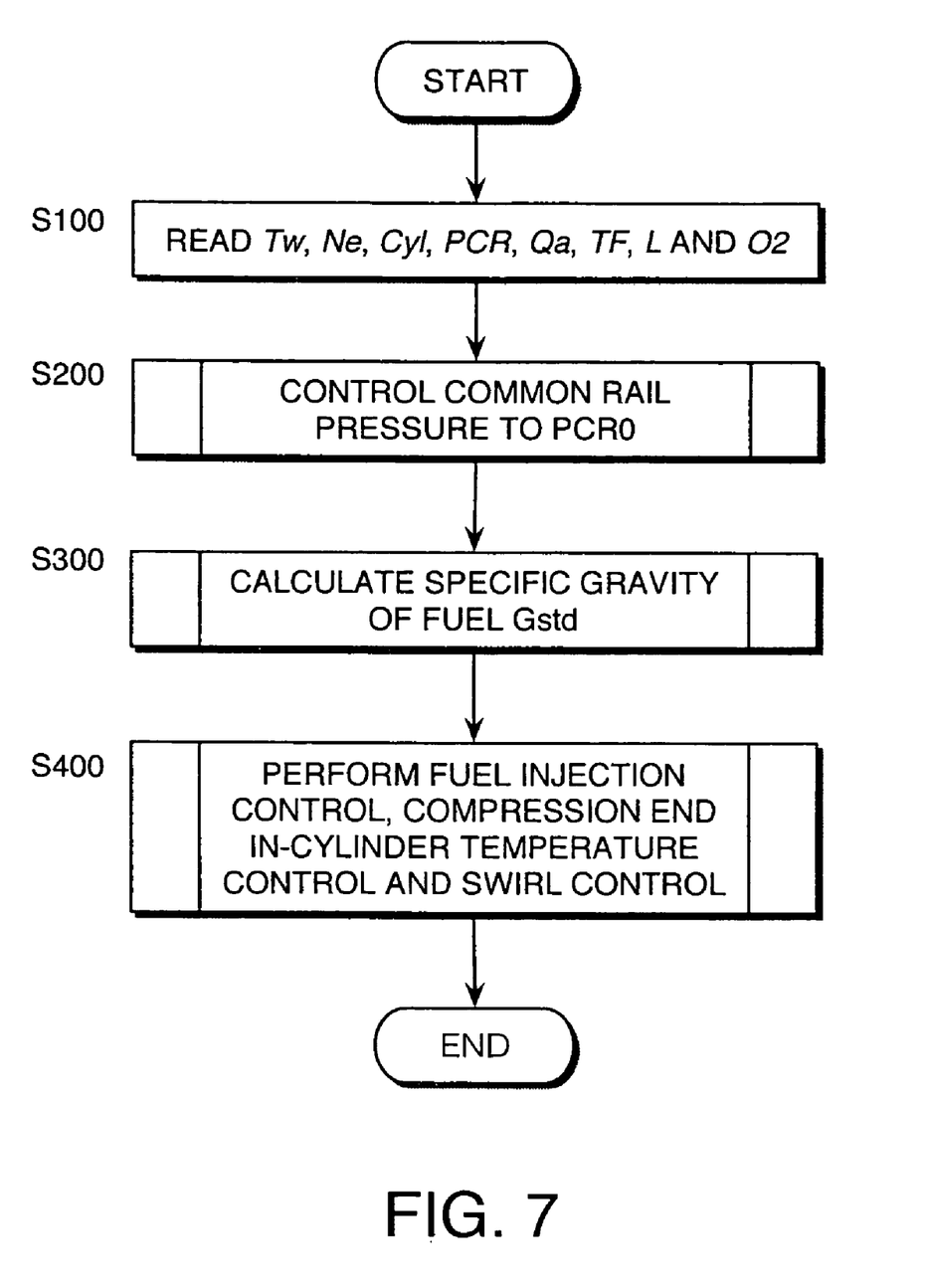
FIG. 7 is a flow chart describing a combustion control main routine of a diesel engine performed by a controller according to this invention.

FIG. 7 shows the main routine of the combustion control performed by the controller 21. This routine is performed at an interval of ten milliseconds during running of the diesel engine 1.

The controller 21, first in a step S100, reads the cooling water temperature Tw, rotation speed Ne, cylinder discrimination signal Cyl, common-rail pressure PCR, intake flowrate Qa, common-rail fuel temperature TF, load L and oxygen concentration O2 of the exhaust gas.

In a next step S200, the controller 21 controls the common-rail pressure based on the read data.

Specifically, the controller 21 looks up a target reference pressure map beforehand stored in the memory (ROM) of the controller 21 based on the rotation speed Ne and load L of the diesel engine 1, and calculates a target reference pressure PCR0 of the common-rail 13. The controller 21 performs feedback control of the opening of the pressure control valve 19 so that a common-rail pressure PCR coincides with the target reference pressure PCR0.

In a next step S300, the controller 21 detects the specific gravity of the fuel, and in a final step S400, performs combustion control of the diesel engine 1 according to the specific gravity of the fuel. Combustion control means fuel injection control, compression end in-cylinder temperature control and swirl control. After the processing of the step S400, the controller 21 terminates the routine.

Figure 8:
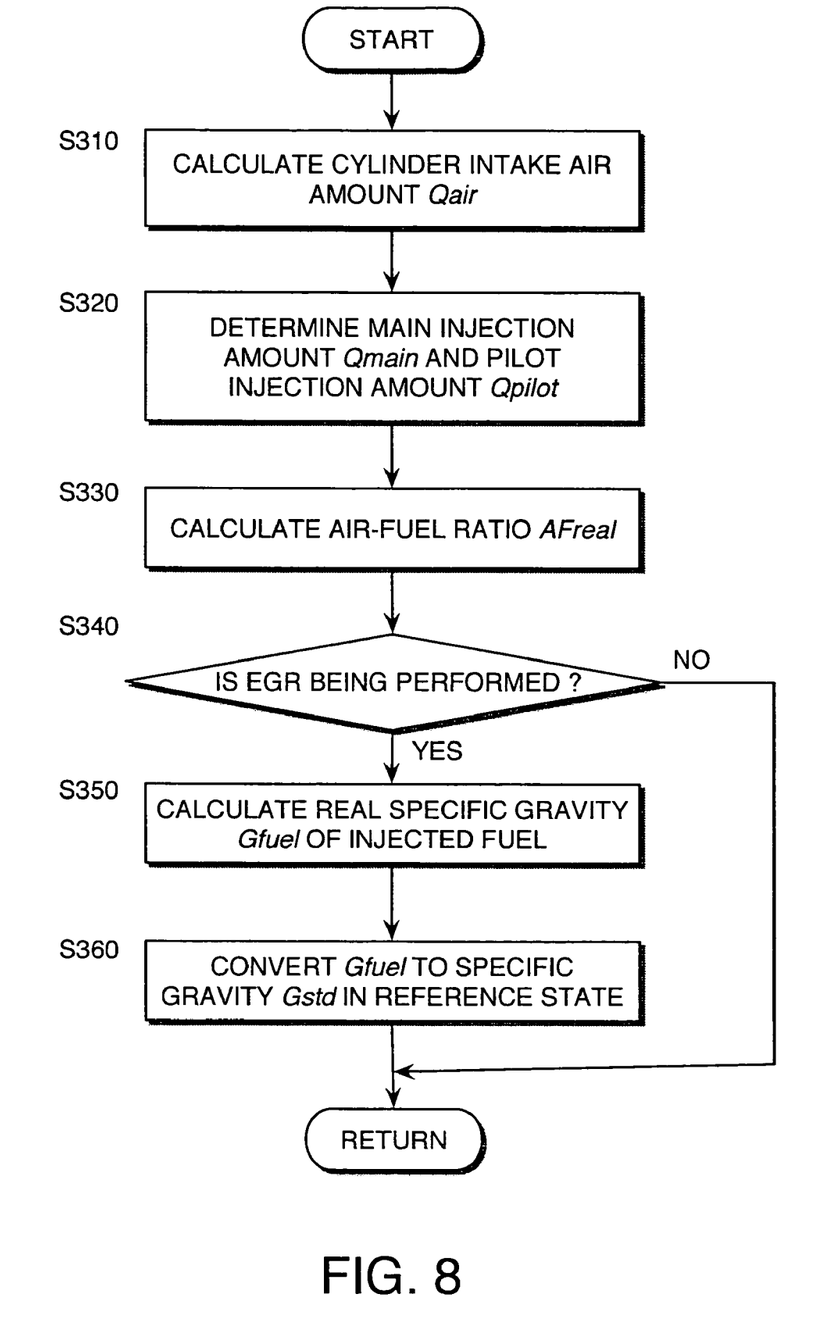
FIG. 8 is a flow chart describing a fuel specific gravity detection subroutine performed by the controller.

The specific gravity detection of the fuel performed in the step S300 is performed by executing the subroutine shown in FIG. 8.

Referring to FIG. 8, first in a step S310, the controller 21 calculates a cylinder intake air amount Qair from the intake flowrate Qa and rotation speed Ne of the diesel engine 1 by looking up a cylinder intake air amount map stored beforehand in the memory (ROM) of the controller 21.

In a next step S320, the controller 21 determines a main injection amount Qmain and pilot injection amount Qpilot of fuel injected into each cylinder by the fuel injection nozzle from the rotation speed Ne and load L of the diesel engine 1, by looking up an injection amount map stored beforehand in the memory (ROM) of the controller 21.

These injection amounts are expressed as reference fuel masses.

As mentioned above, the fuel injection amount corresponds to the ON time of the three-way valve 15. Therefore, it is also possible to store the map of the ON duration time of the three-way valve 15 instead of the map of injection amount in the memory (ROM) of the controller 21. In this case, a main injection period Mperiod and pilot injection period Pperiod are calculated from the duration time map, and the injection periods are converted to an injection amount by looking up another conversion map based on the pressure PCR of the common-rail 13.

In a next step S330, the controller 21 calculates an air-fuel ratio AFreal of the air-fuel mixture burnt in the cylinder 21 from the oxygen concentration O2 in the exhaust gas by looking up an air-fuel ratio map stored in the memory (ROM) of the controller 21.

The processing of the steps S310–S330 is known in the art.

In a next step S340, the controller 21 determines whether or not the running conditions of the diesel engine 1 are suitable for detection of the specific gravity of the fuel.

The diesel engine 1 performs exhaust gas recirculation (EGR) in order to reduce the generation amount of nitrogen oxides (NOx). EGR reduces the oxygen concentration in the exhaust gas, and therefore introduces an error into the air-fuel ratio AFreal of the burning air-fuel mixture calculated from the oxygen concentration O2 in the exhaust gas in the step S330. This error can be rectified, but it is impossible to avoid a lower precision of detection of the air-fuel ratio AFreal. The detection of the specific gravity of the fuel is preferably performed when EGR is not performed.

In the step S340, it is therefore determined whether or not EGR is being performed, and when EGR is not being performed, it is determined that the running conditions of the diesel engine 1 are suitable for detecting the specific gravity of the fuel. When the running conditions of the diesel engine 1 are not suitable for detecting the specific gravity of the fuel, the controller 21 immediately terminates the subroutine.

When the running conditions of the diesel engine 1 are suitable for detecting the specific gravity of the fuel, the controller 21, in a step S350, calculates a specific gravity Gmain of the injected fuel using equation (1), and calculates a real specific gravity Gfuel of the injected fuel using equation (2).

$$Gmain = \frac{Qair}{AFreal} \quad (1)$$

$$Gfuel = \frac{Gmain}{Qmain} \quad (2)$$

In a next step S360, the controller 21 adds a temperature correction to the real specific gravity Gfuel of the fuel. For this purpose, the controller 21 looks up a specific gravity conversion map stored beforehand in the memory (ROM) based on a common-rail fuel temperature TF, and converts the real specific gravity Gfuel of the fuel into a specific gravity Gstd in a reference state. The reference state means the state of twenty degrees Centigrade at atmospheric pressure. Due to this correction, when the common-rail fuel temperature TF at the time of detection of the real specific gravity Gfuel is higher than twenty degrees Centigrade, the specific gravity Gstd is a value obtained by applying an increase correction to the real specific gravity Gfuel. When the common-rail fuel temperature TF at the time of detection of the real specific gravity Gfuel is lower than twenty degrees Centigrade, the specific gravity Gstd is a value obtained by applying a decrease correction to the real specific gravity Gfuel. After calculating the specific gravity Gstd of the fuel in the reference state in the step S360, the controller 21 terminates the subroutine.

Next, the combustion control of the diesel engine 1 performed in the step S400 of FIG. 7 will be described referring to FIG. 9.

As mentioned above, the combustion control of the diesel engine 1 comprises fuel injection control, compression end in-cylinder temperature control and swirl control. These controls are performed based on exclusive control execution flags respectively set by other routines based on the running state of the diesel engine 1. Specifically, when a control execution flag is unity, the controller 21 performs the corresponding control, and when a control execution flag is zero, it skips the corresponding control. Steps S440, S420 and S460 are steps which determine each control execution flag.

In the step S440, the controller 21 first determines whether or not the fuel injection control execution flag is unity. When the fuel injection control execution flag is unity, the controller 21, in a step S410, performs fuel injection control using the subroutine shown in FIG. 10. After the processing of the step S410, the controller 21 performs the processing of a step S450. When the fuel injection control execution flag is not unity, the controller 21 skips the step S410 and performs the processing of the step S450.

In the step S450, the controller 21 determines whether or not the compression end in-cylinder temperature control execution flag is unity. When the compression end in-cylinder temperature control execution flag is unity, the controller 21, in the step S420, performs compression end in-cylinder temperature control using the subroutine shown in FIG. 11. After the processing of the step S420, the controller 21 performs the step S460. When the compression end in-cylinder temperature control execution flag is not unity, the controller 21 skips the step S420 and performs the processing of the step S460.

In the step S460, the controller 21 determines whether or not the swirl control flag is unity. When the swirl control flag is unity, the controller 21, in a step S430, performs the following swirl control. Specifically, the controller 21 calculates a target swirl ratio by looking up a target swirl ratio map stored beforehand in the memory (ROM) based on the rotation speed Ne and load L of the diesel engine 1. The target swirl ratio map is set to a reference fuel for the purpose of controlling the generation amount of hydrocarbons (HC). It is also possible to make the target swirl ratio a fixed value independent of the rotation speed Ne or load L.

The subsequent processing differs depending on whether or not calculation of the fuel specific gravity Gstd in the reference state was performed based on detection of the real specific gravity Gfuel in the fuel specific gravity detection subroutine of FIG. 8.

Specifically, when calculation of the fuel specific gravity Gstd in the reference state was performed, the controller 21 corrects the target swirl ratio by looking up a three-dimensional target swirl ratio correction map stored beforehand in the memory (ROM) based on the fuel specific gravity Gstd and cooling water temperature Tw in the reference state.

On the other hand, when calculation of the fuel specific gravity Gstd in the reference state was not performed, the controller 21 corrects the target swirl ratio by looking up a two-dimensional target swirl ratio correction map stored beforehand in the memory (ROM) based only on the cooling water temperature Tw.

In both of these maps, the increase correction of the target swirl ratio is performed when the cooling water temperature Tw is low. In the map based on the fuel specific gravity Gstd and cooling water temperature Tw, the increase correction of the target swirl ratio is performed as the fuel specific gravity Gstd becomes higher than the specific gravity of a reference fuel.

Figure 15:
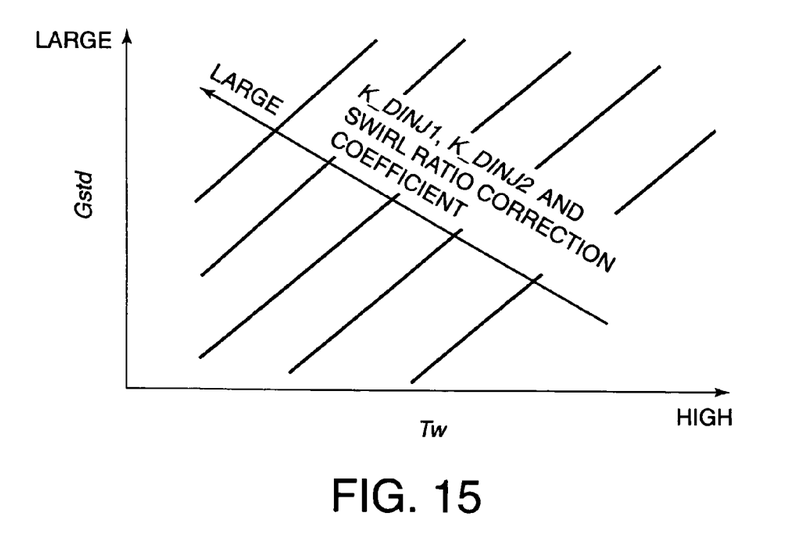
FIG. 15 is a diagram showing the characteristics of maps of a swirl ratio correction coefficient, a fuel injection correction coefficient K_DINJ1, and a compression end in-cylinder temperature correction coefficient K_DINJ2 stored by the controller.

These maps may also be maps which specify a correction coefficient instead of the correction value of the target swirl ratio. In this case, the swirl ratio correction coefficient is set to vary in accordance with the fuel specific gravity Gstd and cooling water temperature Tw as shown in FIG. 15.

The controller 21 decreases the opening of the swirl control valve 51 so that the correction value of the target swirl ratio which was increase corrected in this way, may be realized. Due to this control, even when fuel of different specific gravity from a reference fuel is used, fuel consumption economy during start-up or warm-up of the diesel engine 1 and suppression of production of hydrocarbons (HC), are possible.

Next, referring to FIG. 10, the fuel injection control subroutine performed by the controller 21 in the step S410 will be described.

The controller 21, first in a step S411, determines the pilot injection amount of the fuel supplied to each cylinder by the fuel injection nozzle, pilot injection timing, initial fuel injection rate of the main injection and the fuel injection pressure of the main injection from the rotation speed Ne and load L of the diesel engine 1 by looking up a fuel injection map stored beforehand in the memory (ROM).

Although the fuel injection control of this invention can be applied to a combustion control device which controls at least one the four above-mentioned parameters, herein, all four parameters are controlled.

These four parameters specified by the fuel injection map are all set based on the reference fuel. Hence, if fuel of different specific gravity is used, these parameters are corrected according to the difference in specific gravity between the reference fuel and fuel used. Basically, if a fuel of higher specific gravity than the reference fuel is used, the parameter is corrected in a direction which promotes combustion, and if a fuel of lower specific gravity than the reference fuel is used, the parameter is corrected in a direction which suppresses combustion.

To perform this correction, the controller 21, in a step S412, first determines whether or not calculation of the fuel specific gravity Gstd in the reference state based on detection of the real specific gravity Gfuel was performed in the fuel specific gravity detection subroutine of FIG. 8 executed immediately beforehand.

When the determination result is negative, the controller 21, in a step S413, determines a fuel injection correction coefficient K_TWINJ1 by looking up a two-dimensional fuel injection correction coefficient map stored beforehand in the memory (ROM) based on the cooling water temperature Tw of the diesel engine 1. The fuel injection correction coefficient K_TWINJ1 given by the fuel injection correction coefficient map has the characteristic of increase correcting the pilot injection amount, retardation correcting the pilot injection timing, increase correcting the initial fuel injection rate of the main injection and increase correcting the fuel injection pressure of the main injection as the cooling water temperature Tw falls. This characteristic has the effect of suppressing increase in the generation of hydrocarbons (HC), even when the cooling water temperature Tw is low.

After determining the fuel injection correction coefficient K_TWINJ1 in S413, the controller 21 performs the processing of a step S415.

On the other hand, if the determination result of the step S412 is affirmative, the controller 21, in a step S414, calculates a fuel injection correction coefficient K_DINJ1 by looking up a three-dimensional fuel injection correction coefficient map stored beforehand in the memory (ROM) based on the cooling water temperature Tw and the fuel specific gravity Gstd in the reference state.

The fuel injection correction coefficient K_DINJ1 given by this map has the following characteristics.

Firstly, regarding the cooling water temperature Tw, it has the same characteristics as the fuel injection correction coefficient K_TWINJ1 calculated in the step S413. Specifically, it has the characteristic of increase correcting the pilot injection amount, retardation correcting the pilot injection timing, increase correcting the initial fuel injection rate of the main injection and increase correcting the fuel injection pressure of the main injection as the cooling water temperature Tw falls.

Further, the fuel injection correction coefficient K_DINJ1 has the characteristic of increase correcting the pilot injection amount, retardation correcting the pilot injection timing, increase correcting the initial fuel injection rate of the main injection and increase correcting the fuel injection pressure of the main injection as the fuel specific gravity Gstd in the reference state exceeds the specific gravity of the reference fuel. The above characteristic of the fuel injection correction coefficient K_DINJ1 is summarized in FIG. 15.

After determining the fuel injection correction coefficient K_DINJ1 in the step S414, the controller 21 performs the processing of the step S415.

In the step S415, the controller 21 corrects the pilot injection amount, pilot injection timing, initial fuel injection rate of the main injection and the fuel injection pressure of the main injection using the fuel injection correction coefficient K_TWINJ1 or fuel injection correction coefficient K_DINJ1.

The controller 21 controls the three-way valve 15 so that the pilot injection amount and pilot injection timing after correction are realized. The controller 21 further controls the opening of the valve attached to the three-way valve 15 so that the initial fuel injection rate of the main injection after correction is realized. Moreover, the controller 21 controls the fuel pressure of the common-rail 13 via the pressure control valve 19 so that the fuel injection pressure of the main injection after correction is realized.

After the processing of the step S415, the controller 21 terminates the subroutine.

Next, the compression end in-cylinder temperature control subroutine performed by the controller 21 in the step S420 will be described referring to FIG. 11.

First, in a step S421, the controller 21 calculates a compression end in-cylinder target temperature from the rotation speed Ne and load L of the diesel engine 1 by looking up a compression end in-cylinder target temperature map stored beforehand in the memory (ROM). The compression end in-cylinder target temperature map is set based on a reference fuel.

In a next step S422, the controller 21 determines whether or not calculation of the fuel specific gravity Gstd in the reference state based on detection of the real specific gravity Gfuel was performed in the fuel specific gravity detection subroutine of FIG. 8 executed immediately beforehand.

If the determination result is negative, the controller 21, in a step S423 determines a compression end in-cylinder temperature correction coefficient K_TWINJ2 by looking up a two-dimensional compression end in-cylinder temperature correction coefficient map stored beforehand in the memory (ROM) based on the cooling water temperature Tw of the diesel engine 1.

The compression end in-cylinder temperature correction coefficient K_TWINJ2 given by this compression end in-cylinder temperature correction coefficient map, by increasing the compression end in-cylinder temperature as the cooling water temperature Tw falls, exerts a suppressive effect so that the generation amount of hydrocarbons (HC) does not increase even when the cooling water temperature Tw is low.

After determining the compression end in-cylinder temperature correction coefficient K_TWINJ2 in the step S423, the controller 21 performs the processing of a step S425.

On the other hand, if the determination result of the step S422 is affirmative, the controller 21, in a step S424, calculates the compression end in-cylinder temperature correction coefficient K_DINJ2 by looking up a three-dimensional compression end in-cylinder temperature correction coefficient map stored beforehand in the memory (ROM) based on the cooling water temperature Tw and the fuel specific gravity Gstd in the reference state.

The compression end in-cylinder temperature correction coefficient K_DINJ2 given by this map has the following characteristics.

First, regarding the cooling water temperature Tw, it has the same characteristics as TWINJ2 calculated in the step S423. Specifically, the compression end in-cylinder temperature is increased as the cooling water temperature Tw falls.

Further, the compression end in-cylinder temperature correction coefficient K_DINJ2 has the characteristic of increasing the compression end in-cylinder temperature as the fuel specific gravity Gstd in the reference state exceeds the specific gravity of a reference fuel. The above characteristic of the compression end in-cylinder temperature correction coefficient K_DINJ2 is summarized in FIG. 15.

After determining the compression end in-cylinder temperature correction coefficient K_DINJ2 in the step S424, the controller 21 performs the processing of a step S425.

In the step S425, the controller 21 corrects the compression end in-cylinder target temperature using the compression end in-cylinder temperature correction coefficient K_TWINJ2 or compression end in-cylinder temperature correction coefficient K_DINJ2.

The controller 21 also decreases the opening of the variable nozzle 27 of the variable geometry turbocharger 25 to increase supercharging pressure and increase the intake air amount of the diesel engine 1 so that the compression end in-cylinder target temperature after correction is realized.

The compression end in-cylinder temperature rises due to increased intake air amount of the diesel engine 1, or increased intake air temperature. Therefore, the compression end in-cylinder temperature can be increased by various methods other than by changing the supercharging pressure of the variable geometry turbocharger 25. In an engine provided with a mechanism which can vary the compression ratio, the compression end temperature is increased by increasing the compression ratio. In an engine provided with an intake air cooling device using a coolant, such as an intercooler or an EGR gas cooler, the compression end temperature is increased by reducing the coolant recirculation rate. In an engine provided with an air heating device, the compression end temperature is increased by heating air. In an engine provided with an "after-glow device", the compression end temperature is increased by applying the "after-glow device".

After the processing of the step S425, the controller 21 terminates the subroutine.

As mentioned above, according to this invention, the specific gravity of the fuel used in an internal combustion engine is detected and combustion control is performed according to the detected specific gravity, so engine combustion conditions are always optimized for the fuel used. Therefore, engine exhaust gas composition is improved, and a desirable effect is obtained on reducing fuel consumption.

Figure 5:
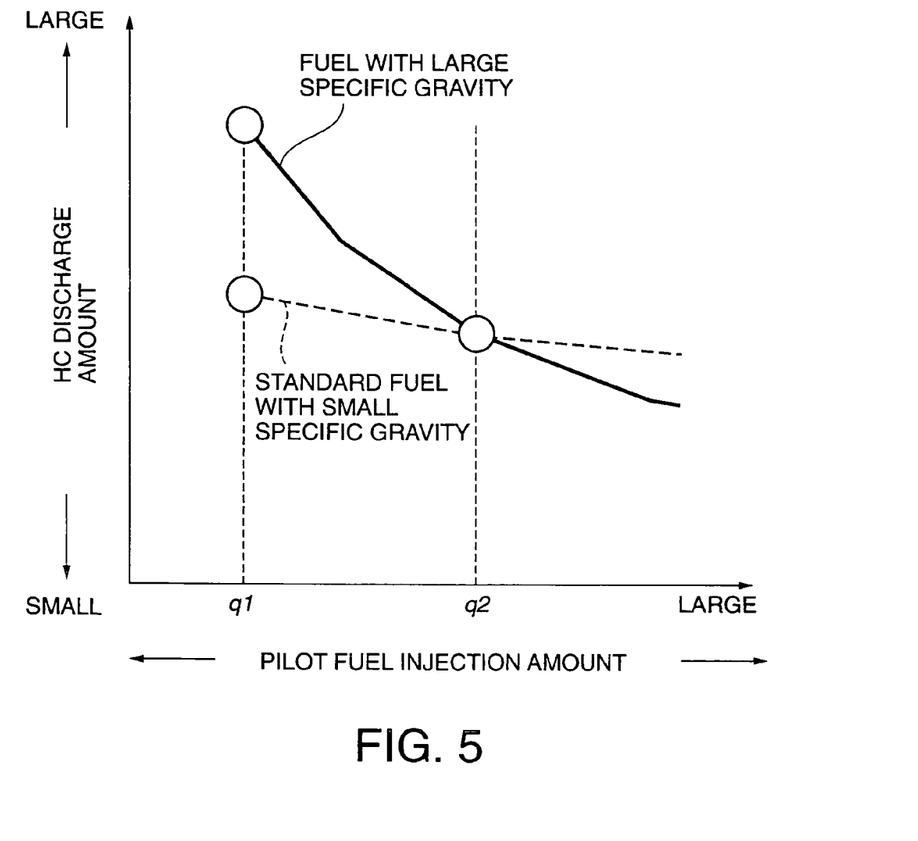
FIG. 5 is a diagram showing a relation between the specific gravity of a fuel, a pilot injection amount and a hydrocarbon discharge amount which the Inventor analyzed for a diesel engine.

FIG. 5 shows the results of an analysis performed by the Inventor on the effect of the specific gravity of the fuel on the relation between the pilot injection amount and the generation amount of hydrocarbons (HC) of the diesel engine. Here, the fuel with the lowest specific gravity in the reference state is set as a reference fuel. The broken line in the figure shows the relation between the pilot injection amount and the HC generation amount when the reference fuel is used. When a fuel with higher specific gravity than that of the reference fuel is used, in the region where the pilot injection amount is less than q2, fuel ignition performance is impaired and the HC generation amount increases.

Figure 6A:
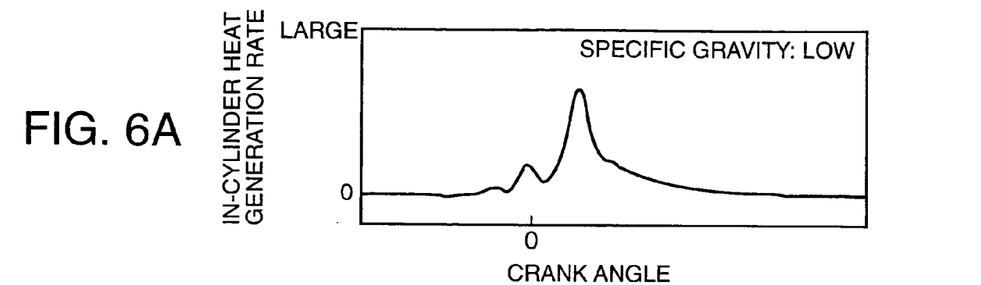
FIGS. 6A–6C are diagrams describing the relation of the specific gravity of a fuel and a cylinder heat production rate verified by the Inventor.
Figure 6B:
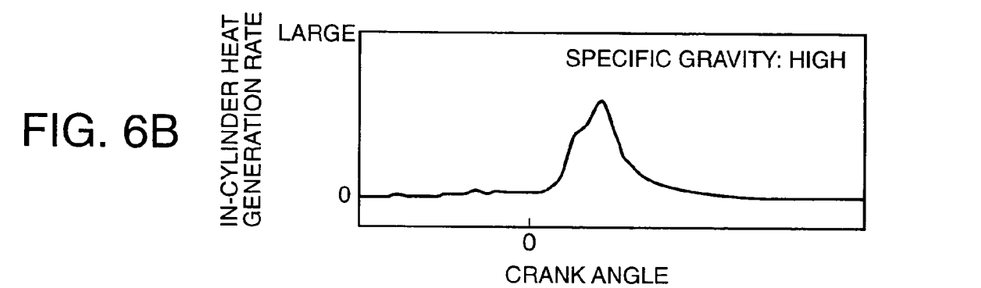
Figure 6C:
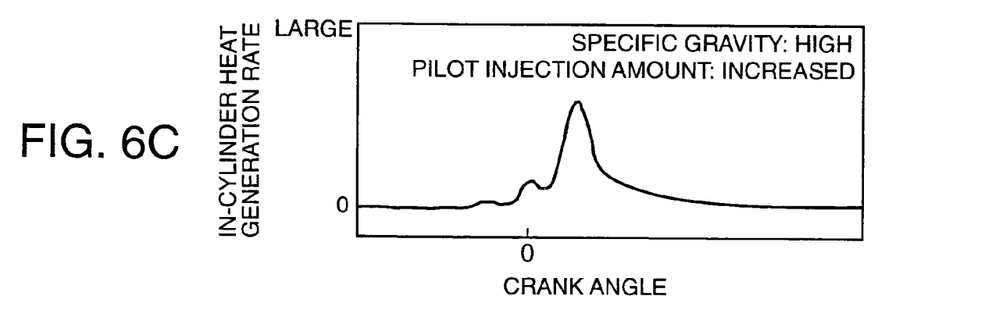

FIGS. 6A–6C show the relation between the specific gravity of the fuel and cylinder heat production rate verified by the Inventor. Using the reference fuel of FIG. 5, when a pilot injection of the injection amount q1 is performed, as shown in FIG. 6A, fuel injected by the pilot injection is burnt before the fuel of the main injection is burnt. In other words, there is clearly a heat production peak due to burning of the pilot injection fuel and a heat production peak due to burning of the main injection fuel.

When the pilot injection is performed using fuel of higher specific gravity than that of the reference fuel corresponding to the solid line of FIG. 5 with the same injection amount and injection timing as those of the reference fuel, the boundary between the peak due to combustion of the pilot injection fuel and the heat production peak due to combustion of the main injection fuel, becomes ambiguous. This is because the combustion start timing of the pilot injection fuel is delayed if fuel of high specific gravity is used. The delay of the combustion start timing of the pilot injection fuel leads to an increase in HC generation amount, as shown in FIG. 5.

When the specific gravity of the fuel is higher than that of the reference fuel, the combustion control device of this embodiment, in the step S415, performs an increase correction of the pilot injection amount and a retardation correction of the pilot injection timing using the fuel injection correction coefficient K_DINJ1. When the pilot injection amount is increased from q1 to q2 as shown in FIG. 5, the in-cylinder heat production rate again has two peaks, as shown in FIG. 6C. This means that the combustion state of the pilot injection fuel has been improved by increasing the pilot injection amount. Also, the retardation of the pilot injection timing brings the combustion start of the pilot injection fuel close to compression top dead center, and increases the ignition performance of fuel with a low cetane number, i. e., poor ignition potential.

Likewise, the combustion control device, in the step S415, increases the initial fuel injection rate and fuel injection pressure of the main injection fuel using the fuel injection correction coefficient K_DINJ1, and in the step S425, increases the compression end in-cylinder temperature using the compression end in-cylinder temperature correction coefficient K_DINJ2. Each of these actions promotes ignition of the injected fuel. The combustion control device, in the step S430, also reinforces the intake air swirl. Due to the reinforcement of intake air swirl, as the injected fuel is mainly distributed near the center of the combustion chamber, the HC generation amount decreases.

As a result, even when using a fuel of large specific gravity, optimal combustion as in the case where the reference fuel is used can be realized, and the HC generation amount and fuel consumption can be suppressed to the same level as when the reference fuel is used.

As mentioned above, in this combustion control device, fuel injection control, compression end in-cylinder temperature control and swirl control are corrected according to the specific gravity of the fuel, but it is not absolutely necessary to correct all these controls according to the specific gravity of the fuel. By correcting one or two of these controls according to the specific gravity of the fuel, combustion conditions can always be optimized for fuels of different cetane number.

The contents of Tokugan 2003-99232, with a filing date of Apr. 2, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in this embodiment, the specific gravity of fuel was determined from the data input from the sensors 7, 32, 36, 37. This invention is however not limited by determining method of the specific gravity of fuel. It is also possible, for example, to manually input or transmit via a communication device the specific gravity of fuel to the controller 21 when refueling is performed.

Figure 9:
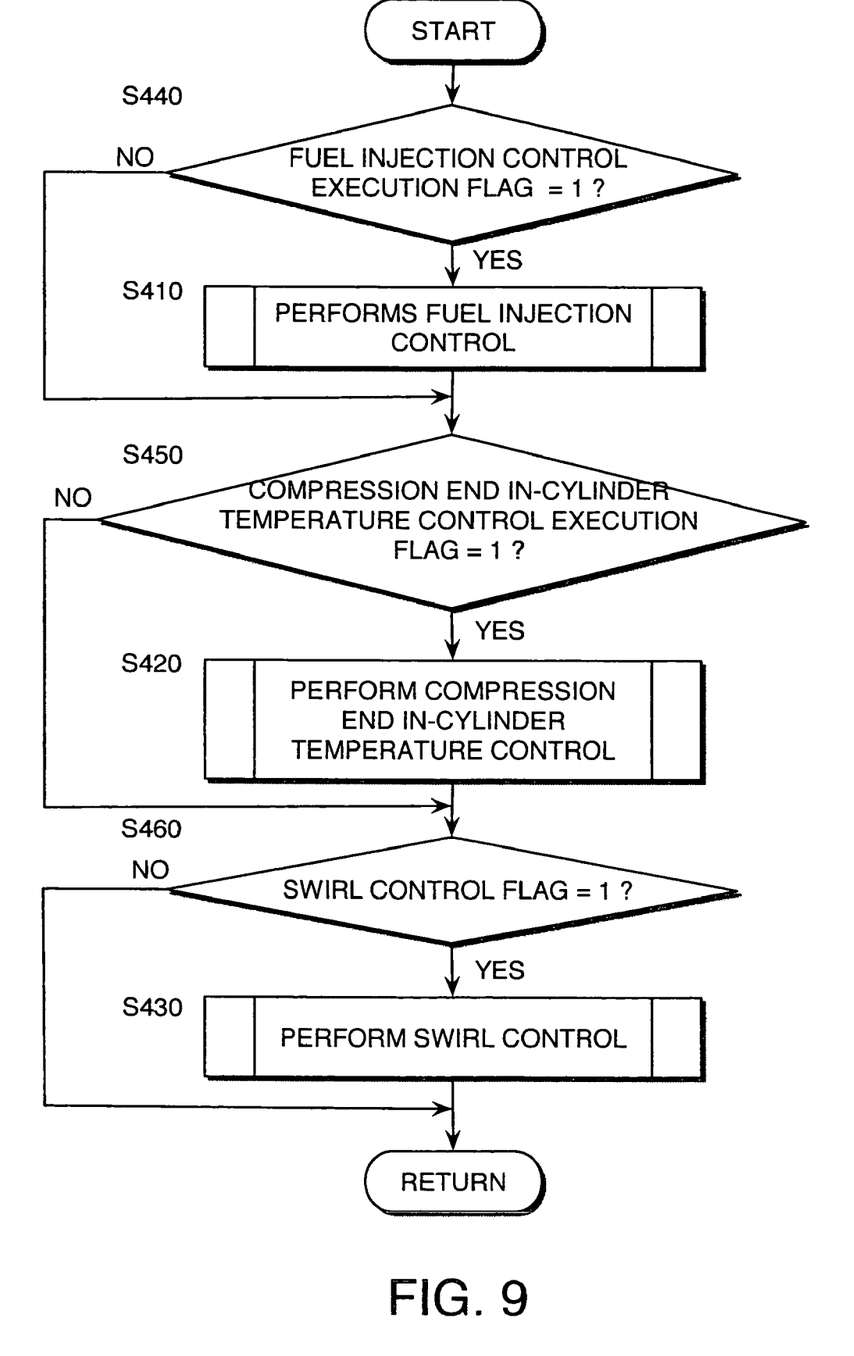
FIG. 9 is a flow chart describing a combustion control subroutine performed by the controller.
Figure 10:
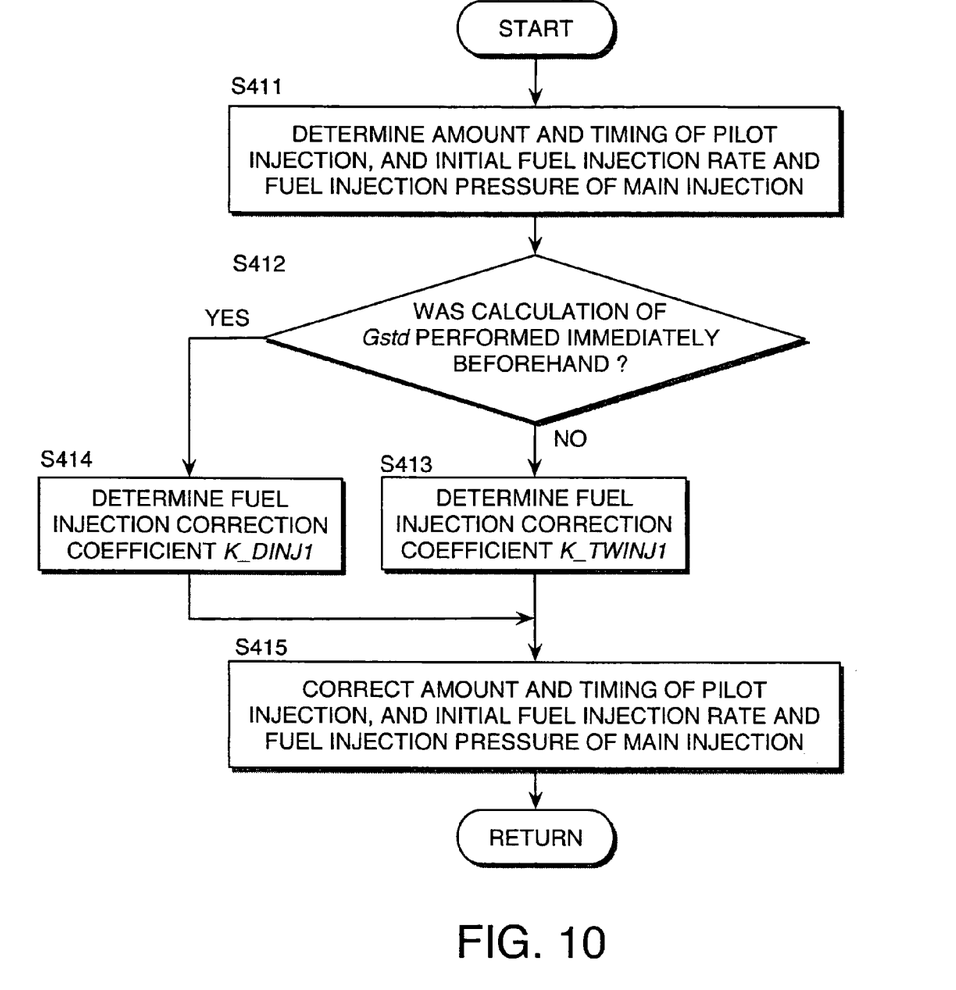
FIG. 10 is a flow chart describing a fuel injection control subroutine performed by the controller.
Figure 11:
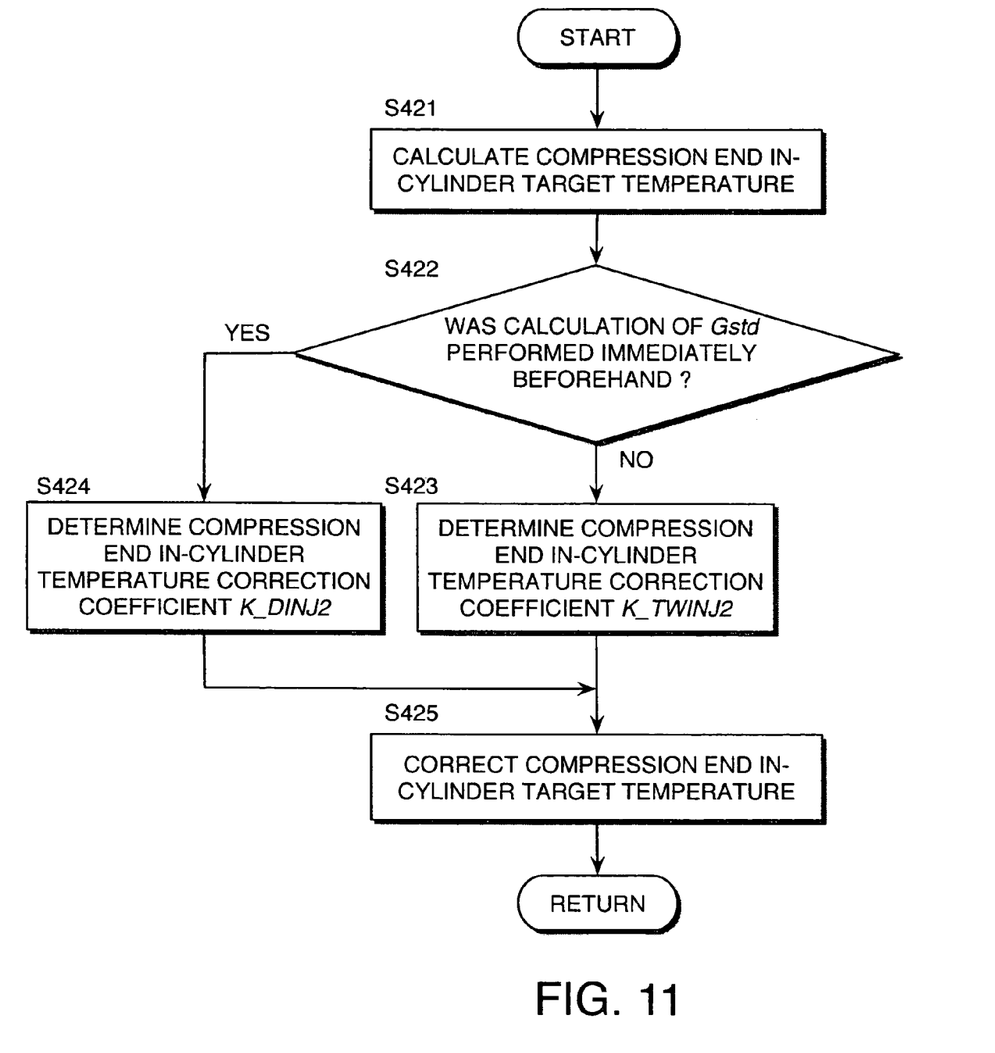
FIG. 11 is a flow chart describing a compression end in-cylinder temperature control subroutine performed by the controller.

In this embodiment, the cooling water temperature Tw was used by the routines or subroutines of FIGS. 9–11 as a parameter representing the temperature of the diesel engine 1. It is also possible to use the temperature of the lubricating oil, the combustion chamber temperature, or the temperature of the cylinder head instead of the cooling water temperature Tw as the parameter representing the temperature of the diesel engine 1.

In this embodiment, the detection of the specific gravity of the fuel performed in the step S300 of FIG. 7 was performed using the subroutine of FIG. 8, but it is also possible to detect the specific gravity of the fuel directly using a sensor instead of the subroutine of FIG. 8.

In this embodiment, although combustion control was performed by taking the specific gravity of the fuel as a parameter, the cetane number of the fuel can be calculated from the specific gravity of the fuel by applying the relation shown in FIG. 2, and combustion control performed based on the cetane number. According to the Inventor's research, calculating the cetane number of the fuel from the specific gravity of the fuel gives a higher detection precision for the cetane number compared with calculating the cetane number of the fuel from the viscosity of the fuel as in the prior art.

In this embodiment, the invention was applied to a diesel engine, the invention may also be applied to a gasoline engine.

The embodiments of this invention in which an exclusive property or is claimed are defined as follows:

What is claimed is:

1. A combustion control device of an internal combustion engine, comprising:
    a fuel injector which injects fuel for combustion in the internal combustion engine;
    a valve which controls a pilot injection amount and a pilot injection timing of the fuel by the fuel injector;
    a sensor which detects a parameter related to a specific gravity of a fuel burnt by the internal combustion engine; and
    a programmable controller programmed to:
        correct a target value of the pilot injection amount and a target value of the pilot injection timing each of which has been defined with respect to a reference fuel, based on the parameter, such that the pilot injection amount is increased while the pilot injection timing is retarded when the specific gravity of the fuel is higher than a specific gravity of the reference fuel; and
        control the fuel injector so that the target values are realized.

2. A combustion control device of an internal combustion engine, comprising:
    a fuel injector which injects fuel for combustion in the internal combustion engine;
    a pressure control valve which controls a fuel injection pressure of the fuel injector;
    a sensor which detects a parameter related to a specific gravity of a fuel burnt by the internal combustion engine; and
    a programmable controller programmed to:
        correct a target value of the fuel injection pressure which has been defined with respect to a reference fuel, based on the parameter, such that the fuel injection pressure is increased when the specific gravity of the fuel is higher than a specific gravity of the reference fuel; and
        control the pressure control valve so that the target value is realized.

3. A combustion control device of an internal combustion engine, comprising:
    a device which adjusts a compression end in-cylinder temperature of the internal combustion engine;
    a sensor which detects a parameter related to a specific gravity of a fuel burnt by the internal combustion engine; and
    a programmable controller programmed to:
        correct a target value of the compression end in-cylinder temperature which has been defined with respect to a reference fuel, based on the parameter; and
        control the compression end in-cylinder temperature adjusting device so that the target value is realized.

4. The combustion control device as defined in claim 3, wherein the compression end in-cylinder temperature adjusting device comprises a turbocharger for supercharging an intake air of the internal combustion engine, the turbocharger comprising a variable nozzle and increasing a supercharging pressure of the intake air according to a decrease of an opening of the variable nozzle, and the controller is further programmed to decrease the opening of the variable nozzle when the specific gravity of the fuel is higher than a specific gravity of the reference fuel.

5. A combustion control device of an internal combustion engine, comprising:
    a device which adjusts an intake air swirl of the internal combustion engine;
    a sensor which detects a parameter related to a specific gravity of a fuel burnt by the internal combustion engine; and
    a programmable controller programmed to:
        correct a target value of the intake air swirl which has been defined with respect to a reference fuel, based on the parameter; and
        control the intake air swirl adjusting device so that the target value is realized.

6. The combustion control device as defined in claim 5, wherein the intake air swirl adjusting device comprises a swirl control valve which throttles an intake cross-sectional area of the internal combustion engine, and the controller is further programmed to decrease an opening of the swirl control valve when the specific gravity of the fuel is higher than a specific gravity of the reference fuel.

7. A combustion control device of an internal combustion engine, comprising:
   a combustion adjusting device which adjusts a combustion-related element of the internal combustion engine;
   a sensor which detects an intake air flowrate of the internal combustion engine;
   a sensor which detects a rotation speed of the internal combustion engine;
   a sensor which detects a load of the internal combustion engine;
   a sensor which detects an oxygen concentration of an exhaust gas of the internal combustion engine; and
   a programmable controller programmed to:
      supply fuel to the internal combustion engine according to a mass of a reference fuel determined based on the rotation speed and the load of the internal combustion engine;
      calculate an air amount of an air-fuel mixture burnt by the internal combustion engine from the intake air flowrate and the rotation speed of the internal combustion engine;
      calculate an air-fuel ratio of the air-fuel mixture burnt by the internal combustion engine from the oxygen concentration of the exhaust gas;
      calculate a real fuel weight contained in the air-fuel mixture burnt by the internal combustion engine from the air-fuel ratio and the air amount of the air-fuel mixture;
      calculate a specific gravity of the fuel supplied to the internal combustion engine from the ratio of the real fuel weight and the mass of the reference fuel;
      correct a target value of the element which has been defined with respect to the reference fuel, based on the specific gravity of the fuel supplied to the internal combustion engine; and
      control the combustion adjusting device so that the target value is realized.

8. The combustion control device as defined in claim 7, wherein the internal combustion engine comprises an exhaust gas recirculation device which recirculates part of an exhaust gas of the internal combustion engine to an intake air thereof, and the controller is further programmed not to calculate the specific gravity of the fuel supplied to the internal combustion engine when the exhaust gas recirculation device is operating.

9. The combustion control device as defined in claim 8, wherein the device further comprises a sensor which detects a temperature of the internal combustion engine, and the controller is further programmed to correct the target value of the element based on the specific gravity of the fuel supplied to the internal combustion engine and the temperature of the internal combustion engine, when the specific gravity of the fuel has been calculated.

10. The combustion control device as defined in claim 9, wherein the controller is further programmed to correct the target value of the element based only on the temperature of the internal combustion engine when the specific gravity of the fuel supplied to the internal combustion engine has not been calculated.

11. A combustion control device of an internal combustion engine, comprising:
   means for adjusting a combustion-related element of the internal combustion engine;
   means for detecting an intake air flowrate of the internal combustion engine;
   means for detecting a rotation speed of the internal combustion engine;
   means for detecting a load of the internal combustion engine;
   means for detecting an oxygen concentration of an exhaust gas of the internal combustion engine;
   means for supplying fuel to the internal combustion engine according to a mass of a reference fuel determined based on the rotation speed and the load of the internal combustion engine;
   means for calculating an air amount of an air-fuel mixture burnt by the internal combustion engine from the intake air flowrate and the rotation speed of the internal combustion engine;
   means for calculating an air-fuel ratio of the air-fuel mixture burnt by the internal combustion engine from the oxygen concentration of the exhaust gas;
   means for calculating a real fuel weight contained in the air-fuel mixture burnt by the internal combustion engine from the air-fuel ratio and the air amount of the air-fuel mixture;
   means for calculating a specific gravity of the fuel supplied to the internal combustion engine from the ratio of the real fuel weight and the mass of the reference fuel;
   means for correcting a target value of the element which has been defined with respect to a reference fuel, based on the specific gravity of the fuel supplied to the internal combustion engine; and
   means for controlling the adjusting means so that the target value is realized.

12. A combustion control method for an internal combustion engine, the engine comprising a combustion adjusting device which adjusts a combustion-related element of the internal combustion engine, the method comprising:
   detecting an intake air flowrate of the internal combustion engine;
   detecting a rotation speed of the internal combustion engine;
   detecting a load of the internal combustion engine;
   detecting an oxygen concentration of an exhaust gas of the internal combustion engine;
   supplying fuel to the internal combustion engine according to a mass of a reference fuel determined based on the rotation speed and the load of the internal combustion engine;
   calculating an air amount of an air-fuel mixture burnt by the internal combustion engine from the intake air flowrate and the rotation speed of the internal combustion engine;
   calculating an air-fuel ratio of the air-fuel mixture burnt by the internal combustion engine from the oxygen concentration of the exhaust gas;
   calculating a real fuel weight contained in the air-fuel mixture burnt by the internal combustion engine from the air-fuel ratio and the air amount of the air-fuel mixture;
   calculating a specific gravity of the fuel supplied to the internal combustion engine from the ratio of the real fuel weight and the mass of the reference fuel;
   correcting a target value of the element which has been defined with respect to the reference fuel, based on the specific gravity of the fuel supplied to the internal combustion engine; and
   controlling the adjusting device so that the target value is realized.

* * * * *